United States Patent [19]

Neamtu

[11] 4,285,528

[45] Aug. 25, 1981

[54] CHUCK ASSEMBLY

[75] Inventor: Nicolae Neamtu, Weymouth, Mass.

[73] Assignee: The Gillette Company, Boston, Mass.

[21] Appl. No.: 141,457

[22] Filed: Apr. 18, 1980

[51] Int. Cl.³ ............................................. B23B 31/40
[52] U.S. Cl. ...................................... 279/2 R; 82/44;
242/48.1; 269/72.1; 279/2 A
[58] Field of Search .............. 279/2 R, 2 A; 242/72.1;
269/48.1; 82/44

[56]  References Cited
U.S. PATENT DOCUMENTS

| 291,282 | 1/1884 | Blue | 279/2 R |
|---|---|---|---|
| 2,280,370 | 4/1942 | Bennett | 242/72.1 |
| 3,776,562 | 12/1973 | Gross et al. | 279/2 R |

FOREIGN PATENT DOCUMENTS 249177  3/1948  Switzerland ............................. 279/2 R Primary Examiner—Robert D. Baldwin
Attorney, Agent, or Firm—Scott R. Foster

[57] ABSTRACT

A chuck assembly includes a plurality of locking keys disposed within longitudinally extending grooves in an outside surface of an arbor and arranged to centrally locate and clamp a hollow work piece to a spindle.

11 Claims, 4 Drawing Figures

CHUCK ASSEMBLY

BACKGROUND OF THE INVENTION

1. Field of the Invention

This invention relates to chuck assemblies, and more particularly, to a chuck assembly adapted to centrally locate and clamp a hollow work piece to a spindle.

2. Description of the Prior Art

Chuck assemblies having arbors arranged to clamp a hollow work piece to a spindle for cutting or peeling are well known in the prior art. For example, the hollow work piece may be slid over the arbor or spindle and clamped in place between an arbor shoulder and a retainer engaged with the arbor. Other chuck assemblies have included a plurality of arbor elements engaging an internal wall of the work piece. The arbor elements are arranged to permit the work piece to be rotated in one direction around its longitudinal axis relative to the arbor while substantially preventing rotation of the work piece relative to the arbor if the arbor is rotated in an opposite direction.

Unfortunately, it is generally difficult to centrally locate the work piece on the arbor or spindle, whereby the successful cutting or peeling of strip material may be impaired. In addition, the clamping force provided by known chucking assemblies have not always been adequate for certain strip peeling operations. It has been determined that an undesired wobble or rotational displacement of the work piece relative to the arbor results in a distortion in the peeled strip.

Accordingly, it is desired to arrange a chuck assembly with improved capability for centrally locating and clamping a hollow work piece to a spindle.

SUMMARY OF THE INVENTION

A chuck assembly for clamping a hollow work piece to a spindle comprises a hollow arbor adapted to slide over the spindle with grooves longitudinally extending along an outside arbor surface. The grooves have an inclined bottom surface. The arbor is attached to the spindle by securing means. Locking keys are slidingly disposed within the arbor grooves with an inclined surface in friction contact with the inclined surface of the grooves. Means are disposed within the arbor for simultaneously moving the locking keys in a forward direction and a predetermined distance outside of said grooves against an internal wall of the work piece to centrally locate and clamp the work piece to the arbor and for moving selected locking keys in a reverse direction back into the grooves to ease removal of the work piece from the arbor.

DESCRIPTION OF THE PREFERRED EMBODIMENT

Figure 1:
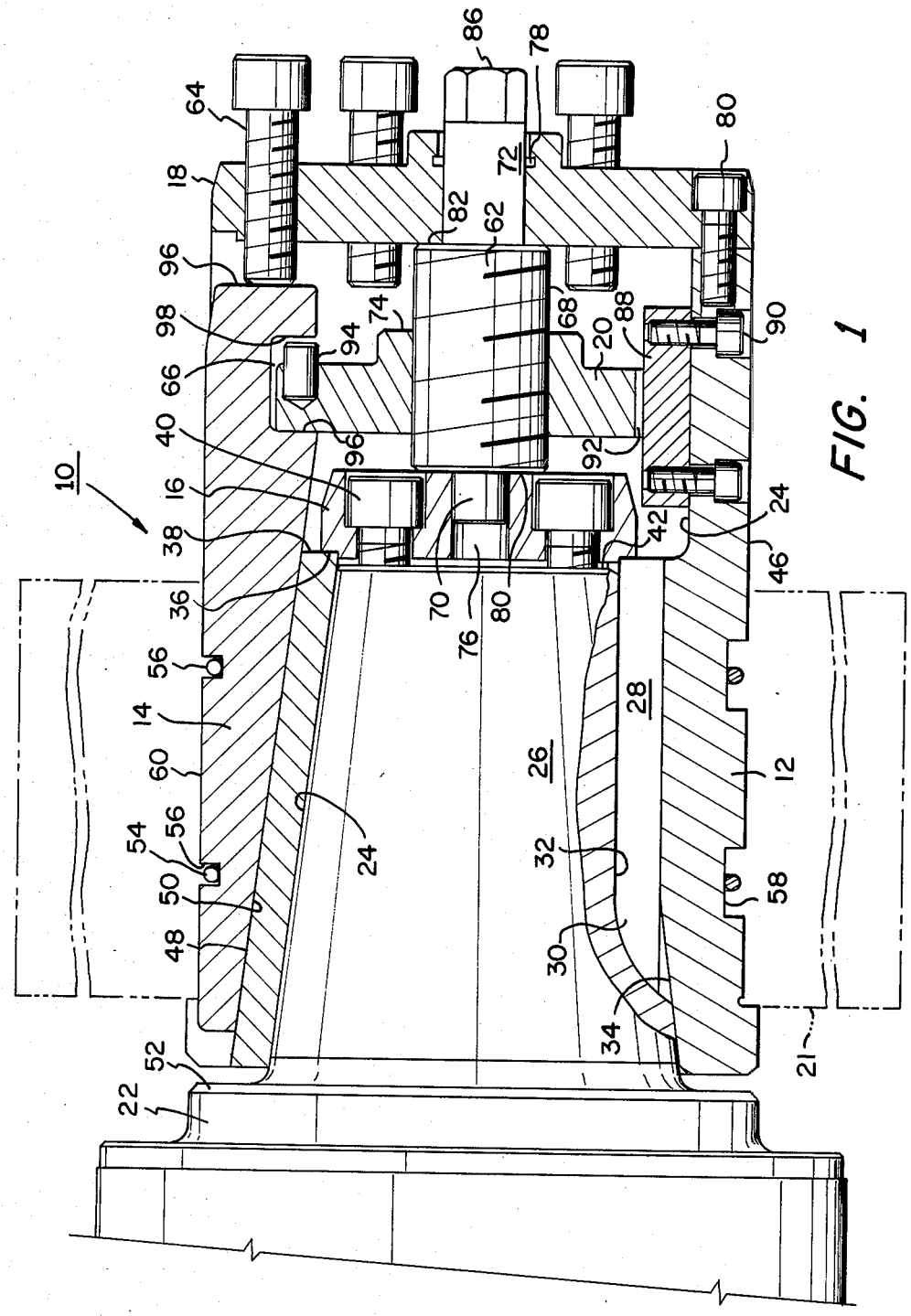
FIG. 1 is a longitudinal sectional view of a chuck assembly according to the invention.
Figure 2:
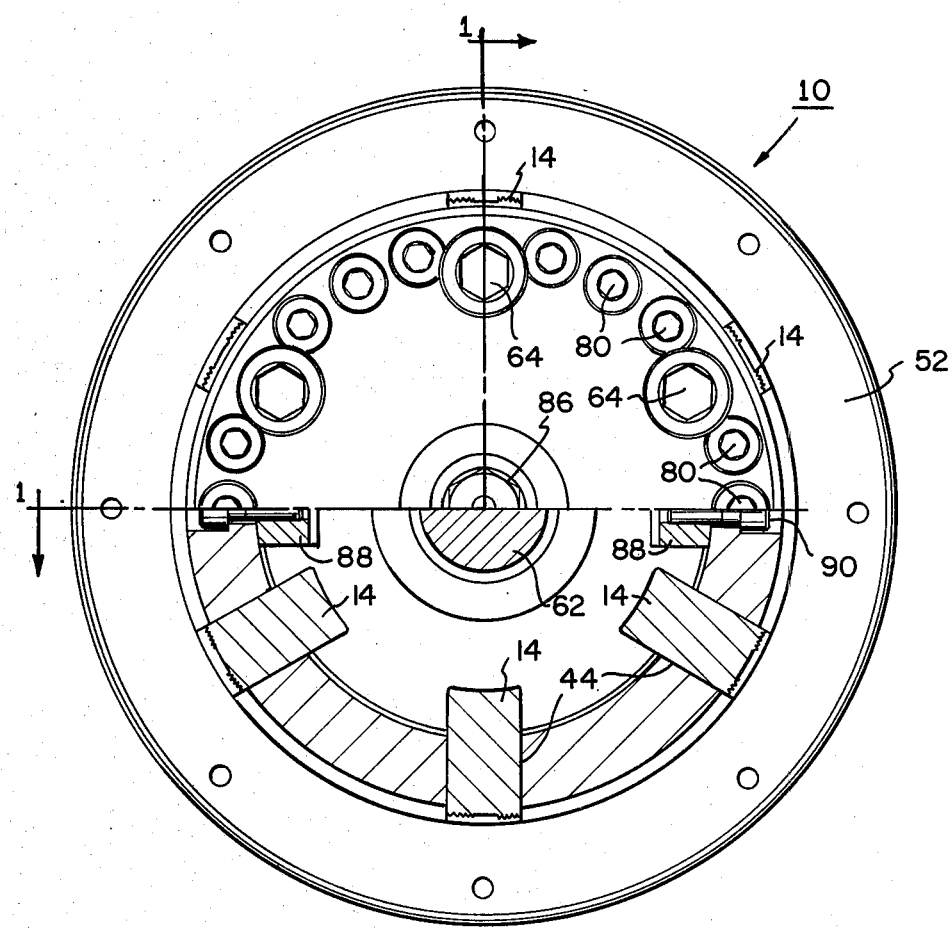
FIG. 2 is a partially sectioned front view taken along line B—B of the chuck assembly shown in FIG. 1.

Referring to FIGS. 1 and 2, there is shown a longitudinal sectional view and a partially sectioned front view of a chuck assembly 10 arranged according to the invention. In one embodiment, the chuck assembly 10 includes a combination of a cylindrical hollow arbor 12, a plurality of self locking keys 14, first and second thrust plates 16, 18 and a pressure plate 20. The chuck assembly 10 is adapted to locate the center of a hollow work piece such as a cylindrical metal billet, shown in dotted section 21, and then clamp it securely to a rotatable spindle 22 for cutting or peeling. The arbor 12 has a truncated conical internal wall 24 formed to slide over a truncated conical spindle nose 26 and a spline 28 or key with a gently curved or tapered end 30 received partially in a complementary shaped spindle keyway 32 and partially in a tapered keyway 34 in the internal arbor wall 24. The spline 28 is intended to minimize undesirable rotational displacement of the arbor relative to the spindle 22 when the spline 28 and arbor 12 are held in place on the spindle nose 26 by the locking thrust plate 16 detachably coupled to the spindle nose 26. Means for detachably holding an annular lip 36 on the first, or locking, thrust plate 16 against an opposing end of the spline 28 and a lip 38 on the internal arbor wall 24 include a plurality of screws 40 inserted through clearance holes in the locking thrust plate 16 and screwed into tapped holes in the truncated end 42 of the spindle nose 26.

The self locking keys 14 are slid into place in a plurality of longitudinal grooves 44 in an outside surface 46 of the arbor 12. The bottom surface 48 of the arbor groove 44 is inclined and friction contact with a complementary inclined surface 50 of the keys 14 for causing the keys 14 to move outwardly and against an internal wall of the work piece as they are pushed toward the spindle end 52. Resilient snap rings 54 are assembled in radial grooves 56, 58 on outside surfaces 60, 46 on the self locking keys 14 and arbor 12, respectively, to provide sufficient bias force to prevent the self locking keys 14 from falling out of the arbor grooves 44, yet permit a reciprocal sliding movement of the keys 14. The radial grooves 58 on the arbor 12 are wider than the radial grooves 56 on the self locking keys 14 to permit a sliding reciprocal displacement of the self locking keys 14 relative to the spindle end 22. Means for reciprocally moving the self locking keys 14 in the longitudinally extending arbor grooves 44 against the work piece include the pressure plate 20, a motion screw 62, the second thrust plate 18 and a plurality of pressure screws 64. The pressure plate 20 is disposed within the arbor 12 and in a radial groove 66 at an end of the inclined surface 50 of the self locking keys 14. The motion screw 62 has a threaded portion 68 intermediate first 70 and second 72 non-threaded portions. The threaded portion 68 is engaged in a threaded hole in the center or hub 74 of the pressure plate 20. The first non-threaded portion 70 of the motion screw 62 is received in a central bore 76 in the locking thrust plate 16. The second non-threaded portion 72 of the motion screw 62 is received in a central bore 78 in the second thrust plate 18 attached to an end of the arbor 12 by screws 80. The bores 76, 78 in the locking thrust plate 16 and second thrust plate 18 are substantially coaxial and intended to provide bearing surfaces for the non-threaded portions 70, 72 of the motion screw 62. The diameters of non-threaded portions 70, 72 of the motion screw 62 are smaller than the diameter of the threaded portion 68 of the motion screw 62 to form shoulders 82, 84 which bear against opposing surfaces of the locking thrust plate 16 and second thrust plate 18.

The second non-threaded portion 72 of the motion screw 62 has a socket head 86 that projects through the bore 78 of the second thrust plate 18. An appropriate sized socket head wrench may be attached to the socket head 86 for rotating the motion screw 62 to reciprocally move the pressure plate 20 against the self locking key 14.

A feather key 88 is attached to the internal arbor wall 24 by screws 90 to fit in a longitudinal slot 92 in the pressure plate 20 to substantially prevent rotational displacement of the pressure plate 20 relative to the arbor 12.

The self locking keys 14 are moved simultaneously in the arbor slots 44 toward the spindle end 52 and a uniform distance out of the arbor slots 44 against the internal wall of the work piece to centrally locate it on the arbor 12 when the motion screw 62 is rotated clockwise. The self locking keys 14 are moved in the slots 44 individually or in pairs in a predetermined sequence away from the internal work piece wall to ease removal of the work piece from the arbor 12 when the motion screw 62 is rotated counterclockwise. Means for enabling movement of selected self locking keys 14 when the motion screw 62 is rotated counterclockwise include a plurality of pressure pins 94 orthogonally projecting from the pressure plate section inside the groove 66 in the self locking key 14. The pressure pins 94 extend various distances beyond the surface of the pressure plate 20 section so that the longest extending pressure pins will strike and move, in order of projecting length, selected self locking keys 14 when the motion screw 62 is rotated counterclockwise.

The pressure screws 64 are threaded into the second thrust plate 18 to bear against an opposing end 96 of the self-locking keys 14. The pressure screws 64 are intended to provide means for further tightening individual self locking keys 14 against the internal wall of the work piece and clamping it more securely to the arbor 12.

The chuck 10 is assembled on the spindle nose 26 in the following manner. The arbor 12 is first slipped over the spindle nose 26, and then the spline 28 is pushed through an open end of the arbor 12 and slid into position in the keyways 32,34 in the arbor 12 and spindle nose 26. The locking thrust plate 16 is pushed through the arbor open end and attached by screws 40 to the truncated end of the spindle nose 26 with the annular lip 36 of the locking thrust plate 16 bearing against an opposing end of the spline 28 and the lip 38 on the internal arbor wall 24. The motion screw 62 is threaded into the pressure plate 20 so that first 70 and second non-threaded portions project beyond opposite sides of the pressure plate 20. Pressure pins 94 of various lengths are forced into holes near an edge on one side of the pressure plate 20. The assembled pressure plate 20 and motion screw 62 is pushed through the arbor open end so that the pressure plate slot 92 slides over the feather key 88 on the internal arbor wall 24 and the first non-threaded end 70 of the motion screw 62 is received in the bore 76 in the locking thrust plate 16.

The self locking keys 14 are assembled in place in the longitudinal grooves 44 around the outside surface 46 of the arbor 12. The inclined surfaces 50 of the keys 14 are in friction contact with the inclined surfaces 48 of the grooves 44 and the radial groove 66 at the end of the keys 14 fits over the pressure plate 20 and extending pressure pins 94. Snap rings 54 are placed in the outside radial grooves 56 in the keys 14 to hold them in the arbor grooves 44. The bore 78 in the second thrust plate 18 is slipped over the second non-threaded end 72 of the motion screw 62 so that the second thrust plate 18 covers the open end of the arbor 12. Screws 80 are used to attach the second thrust plate 18 to the arbor end.

After the chuck 10 is assembled on the spindle nose 26, the hollow work piece is slid over the arbor 12 and self locking keys 14. The socket head 86 formed on the second non-threaded end 72 of the motion screw 62 is rotated clockwise to advance the pressure plate 20 against a side wall 96 of the radial groove 66 in the self locking keys 14, whereby the inclined surface 50 of the keys 14 are caused to simultaneously move along the inclined surface 48 of the arbor grooves 44. The movement of the keys 14 continues until the keys 14 move a uniform distance out of the arbor grooves 44 to bear against an internal wall of the work piece to centrally locate and clamp the work piece to the arbor 12. Clamping force exerted by the self-locking keys 14 against the work piece is increased when the pressure screws 64 on the second thrust plate 18 are advanced against opposing ends 96 of individual self locking keys 14. Clamping force of the self locking keys 14 may be enhanced by forming teeth or serrations on a self locking key surface 60 normally in contact with the work piece.

The work piece is removed from the chuck 10 by first rotating the pressure screws 64 away from the end 96 of the self locking keys 14. The motion screw is then rotated counterclockwise until the pressure pins 94 strike a side wall 98 in the radial groove 66 in individual self locking keys 14 in a desired sequence causing selected keys 14 to move into the arbor grooves 44 toward the second thrust plate 18 and away from contact with the work piece. It has been determined that individual retractions of the self locking keys 14 into the arbor grooves 44 reduces the torque on the motion screw 62 required to overcome the frictional and clamping force developed by all the self locking keys 14.

Figure 3:
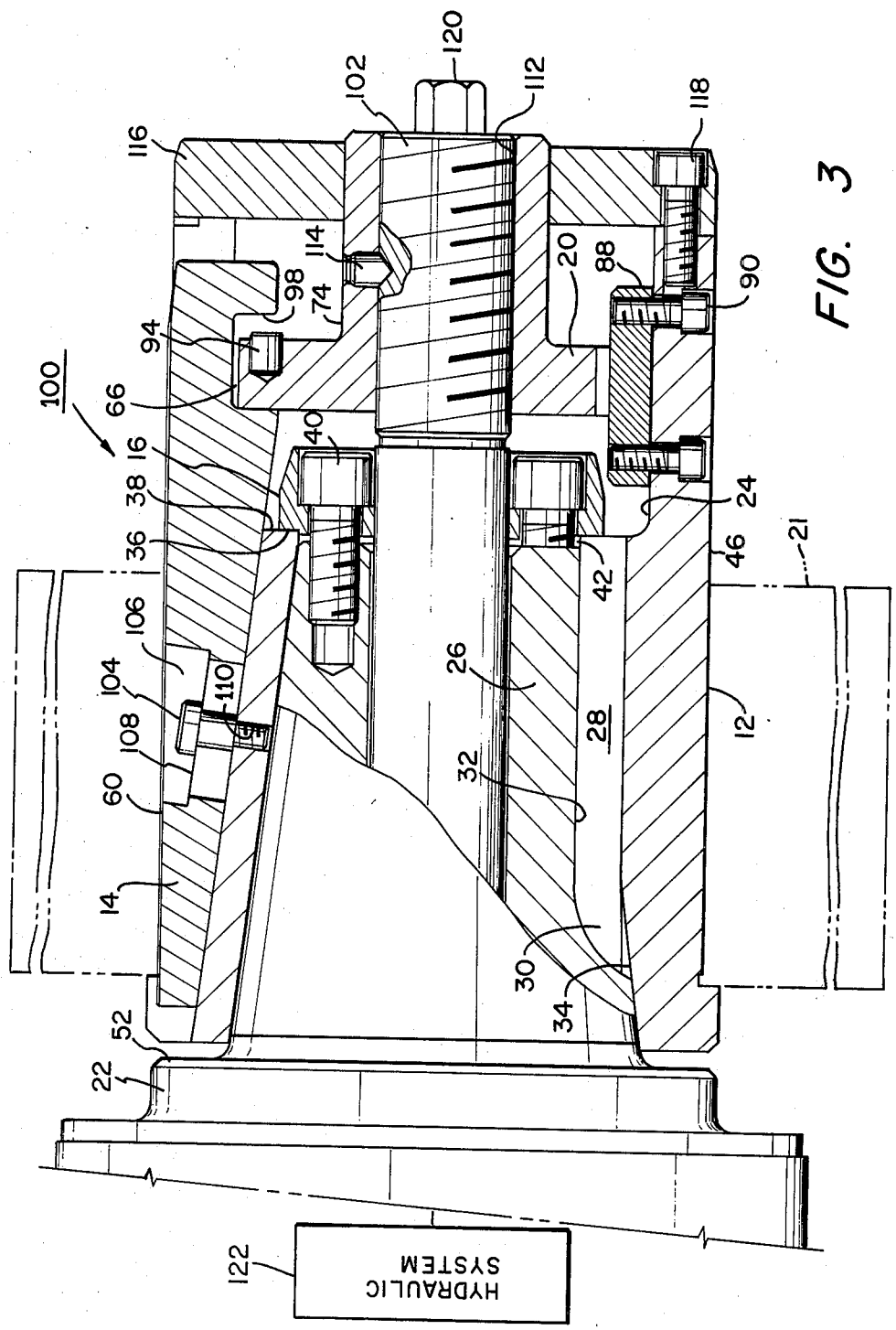
FIG. 3 is a longitudinal sectional view of another embodiment of a chuck assembly arranged according to the invention.
Figure 4:
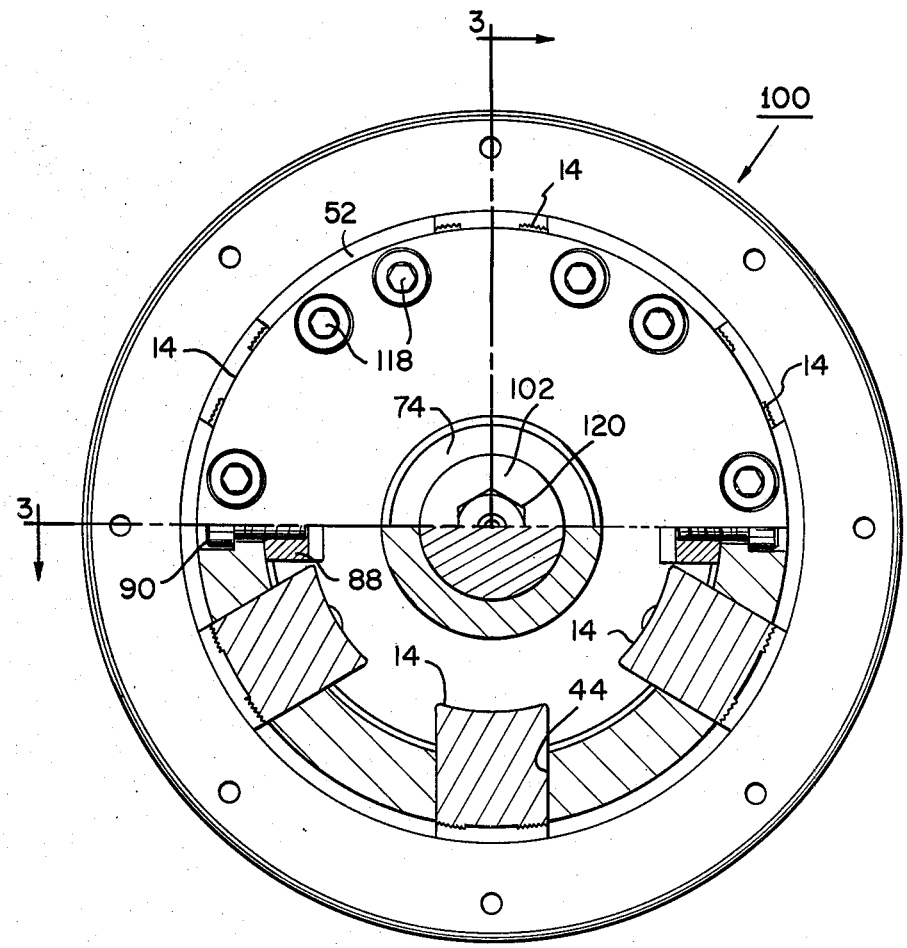
FIG. 4 is a partially sectioned front view taken along line B—B of the chuck assembly shown in FIG. 3.

Referring to FIGS. 3 and 4, there is shown a longitudinal sectional view and a front sectional view of an embodiment of a hydraulic chuck assembly 100 arranged according to the invention. For convenience, reference numbers in FIGS. 1 and 2 are used to identify like elements in FIGS. 3 and 4. The hydraulic chuck assembly 100 includes a combination of a cylindrical hollow arbor 12, a plurality of self locking keys 14, a locking thrust plate 16 and a pressure plate 20 connected to a hydraulically driven draw bar 102. The arbor 12 has a truncated conical internal wall 24 formed to slide over a hollow truncated conical spindle nose 26 and a spline 28 or key with a gently curved or tapered end 30 received partially in a complementary shaped spindle keyway 32 and partially in a tapered keyway 34 in the internal arbor wall 24. The spline 28 is intended to minimize undesirable rotational displacement of the arbor 12 relative to the spindle 22 when the spline 28 and arbor 12 are held in place on the spindle nose 26 by the cylindrically shaped locking thrust plate 16 detachably coupled to the spindle nose 26. Means for detachably holding an annular lip 36 on the locking thrust plate 16 against an opposing end of the spline 28 and a lip 38 on the internal arbor wall 24 include a plurality of screws 40 inserted through clearance holes in the locking thrust plate 16 and screwed into tapped holes in the truncated end 42 of the spindle nose 26.

The self locking keys 14 are slid into place in a plurality of longitudinal grooves 44 in an outside surface 46 of the arbor 12. The bottom surface 48 of the arbor groove 44 is inclined and in friction contact with a complementary inclined surface 50 of the keys 14 for causing the keys 14 to move outwardly and against an internal wall of the work piece as they are pushed toward the spindle end 52. Shoulder screws 104 are inserted into a slotted through hole 106 with a lip 108 in the self locking keys 14 and then threaded into an orthogonally tapped hole 110 in the inclined surface 50 of the arbor groove 44. The screw shoulder 104 rests lightly against the lip 108 in the slotted hole 106 to prevent the self locking keys 14 from falling out of the arbor grooves 44 while permitting the keys 14 to reciprocally slide in the grooves 44.

Means for reciprocally sliding the self locking keys 14 in the arbor grooves 44 include the pressure plate 20 and hydraulically operated draw bar 102. The pressure plate 20 is disposed within the arbor 12 and in a radial groove 66 at an end of the inclined surface 50 of the self locking key 14. The draw bar 102 has a threaded portion 112 engaged in a threaded hole in the center or hub 74 of the pressure plate 20. A feather key 88 is attached to the internal arbor wall 24 by screws 90 to fit in a longitudinal slot 92 in the pressure plate 20 to substantially prevent undesired rotational displacement of the pressure plate 20 relative to the arbor 12. A cone point socket set screw 114 is threadingly engaged in a threaded hole in the pressure plate 20 so that the cone point 114 is received in a hole in the draw bar 102 to help lock the pressure plate 20 in place on the draw bar 102.

A cover plate 116 is attached by screws 118 to cover the open end of the arbor 12. An end of the draw bar 102 with a socket head 120 and the pressure plate hub 74 projects through a central bore in the cover plate 116 to facilitate assembly adjustment, or removal, of the pressure plate 20 and the draw bar 102 from the chuck assembly 100.

The self locking keys 14 are moved simultaneously in the arbor slots 44 in a forward direction toward the spindle ends and outwardly from the slots 44 a uniform distance against the internal wall of the work piece when the draw bar 102 is moved toward the spindle end 52 by a known hydraulic system 122.

The self locking keys 14 are moved back into the slots individually or in pairs in a predetermined sequence away from the internal wall of the work piece when the draw bar 102 is caused to move in a reverse direction toward the cover plate 116 by the hydraulic system 122. Pressure pins 94 orthogonally projecting various distances from the pressure plate section inside the self locking key grooves 66, sequentially strike and move, in order of projecting length, selected self locking keys 14 when the draw bar 102 is moved in the reverse direction.

Manually and hydraulically operated embodiments of the invention have been described by way of example. Various other embodiments and modifications thereof will be apparent to those skilled in the art within the scope of the invention defined in the following claims.

What is claimed as new and desirous to be secured by Letters Patent of the United States is:

1. A chuck assembly for clampimng a hollow work piece to a spindle comprising:
   a hollow arbor adapted to slide over said spindle with grooves longitudinally extending along an outside arbor surface, said grooves having an inclined bottom surface;
   means for securing said arbor to said spindle;
   locking keys being slidingly disposed within said arbor grooves with an inclined surface in friction contact with said inclined surface of said grooves; and
   means dipsosed within said arbor for simultaneously moving said locking keys in a forward direction and a predetermined distance outside of said grooves against an internal wall of said work piece to centrally locate and clamp said workpiece to said arbor and for moving selected locking keys in a reverse direction back into said grooves to ease removal of said work piece from said arbor.

2. A chuck assembly in accordance with claim 1, further including means coupled to said arbor and spindle for substantially preventing rotation of said arbor relative to said spindle.

3. A chuck assembly in accordance with claim 2, wherein said means for substantially preventing rotational displacement of said arbor relative to said spindle include a key received partially in a longitudinally extending groove in an internal wall of said arbor and partially in a longitudinally extending groove in said spindle.

4. A chuck assembly in accordance with claim 3, further including means for simultaneously coupling said arbor and key to said spindle.

5. A chuck assembly in accordance with claim 4, wherein said coupling means is a first thrust plate disposed within said arbor and attached by screws to an end of the spindle with a lip bearing against an end of said key and a lip formed on an internal wall of said arbor.

6. A chuck assembly in accordance with claim 1, wherein said means for moving said locking keys include a pressure plate disposed within said arbor and a slot in said locking keys, and means for reciprocally moving said pressure plate against said locking keys.

7. A chuck assembly in accordance with claim 6, further including a feather key attached to an internal arbor wall to fit within a longitudinal slot in said pressure plate to substantially prevent rotational displacement of said pressure plate relative to said arbor.

8. A chuck assembly in accordance with claim 6, wherein said pressure plate has pressure pins extending various distances beyond said plate to bear against selected locking keys in a predetermined sequence when said pressure plate is moved in a reverse direction.

9. A chuck assembly in accordance with claim 6, wherein said means for moving said pressure plate include a motion screw threadingly engaged with said pressure plate and bearing against first and second thrust plates to cause a linear displacement of said locking keys when rotated.

10. A chuck assembly in accordance with claim 6, wherein said means for moving said pressure plate include a hydraulically operated draw bar attached to said pressure plate.

11. A chuck assembly in accordance with claim 9, further including pressure screws threadingly engaged in said second thrust plate and bearing against opposing ends of said locking keys to help clamp said work piece to said arbor.

* * * * *